Jan. 27, 1925.
E. BALLEW
1,524,011
FISHING MACHINE
Filed June 3, 1924
2 Sheets-Sheet 1
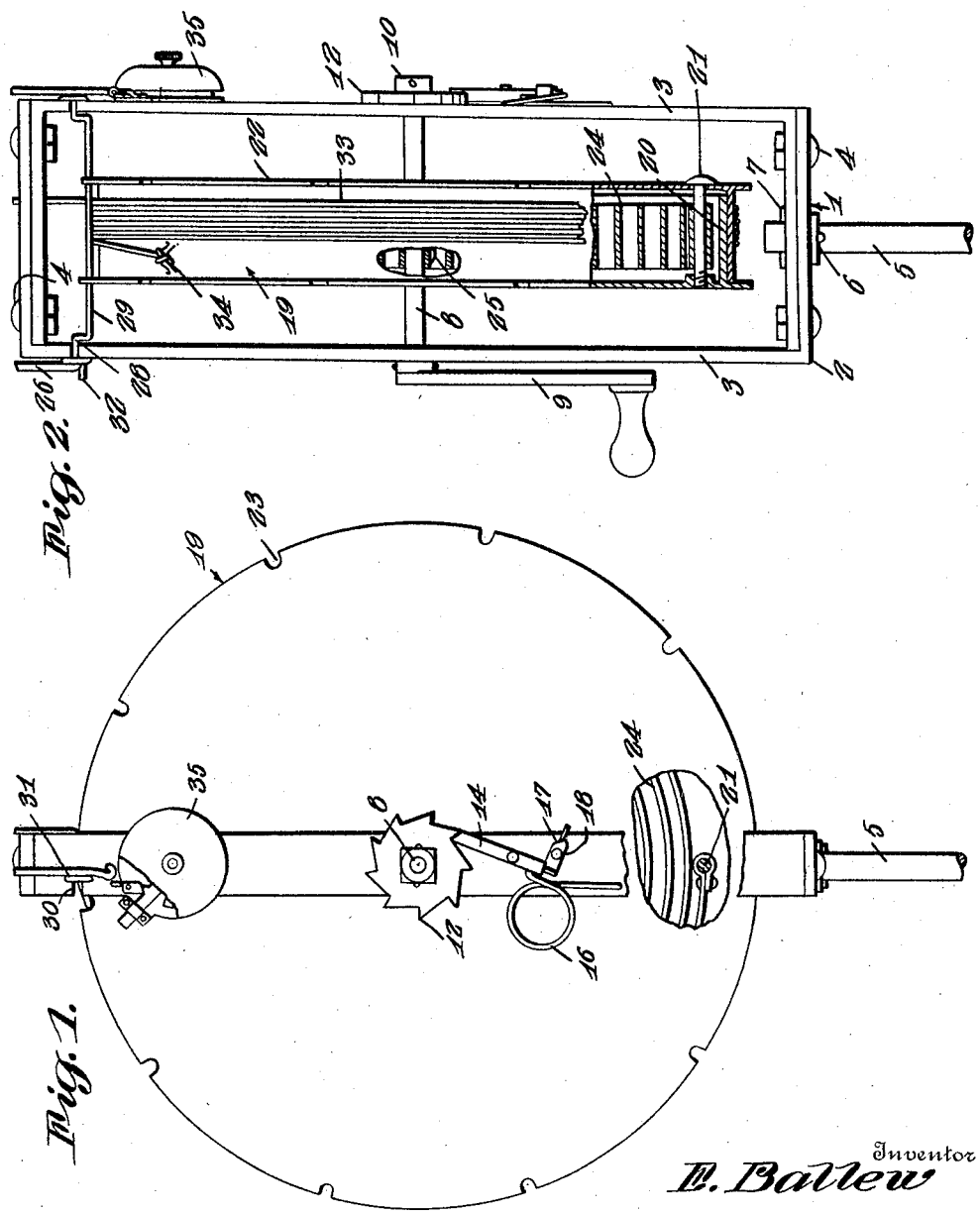

Jan. 27 1925.
E. BALLEW
FISHING MACHINE
Filed June 3, 1924
1,524,011
2 Sheets-Sheet 2
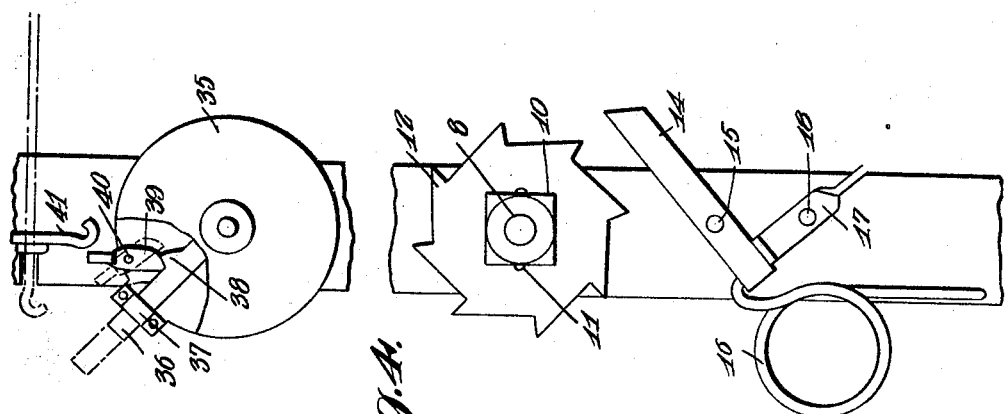
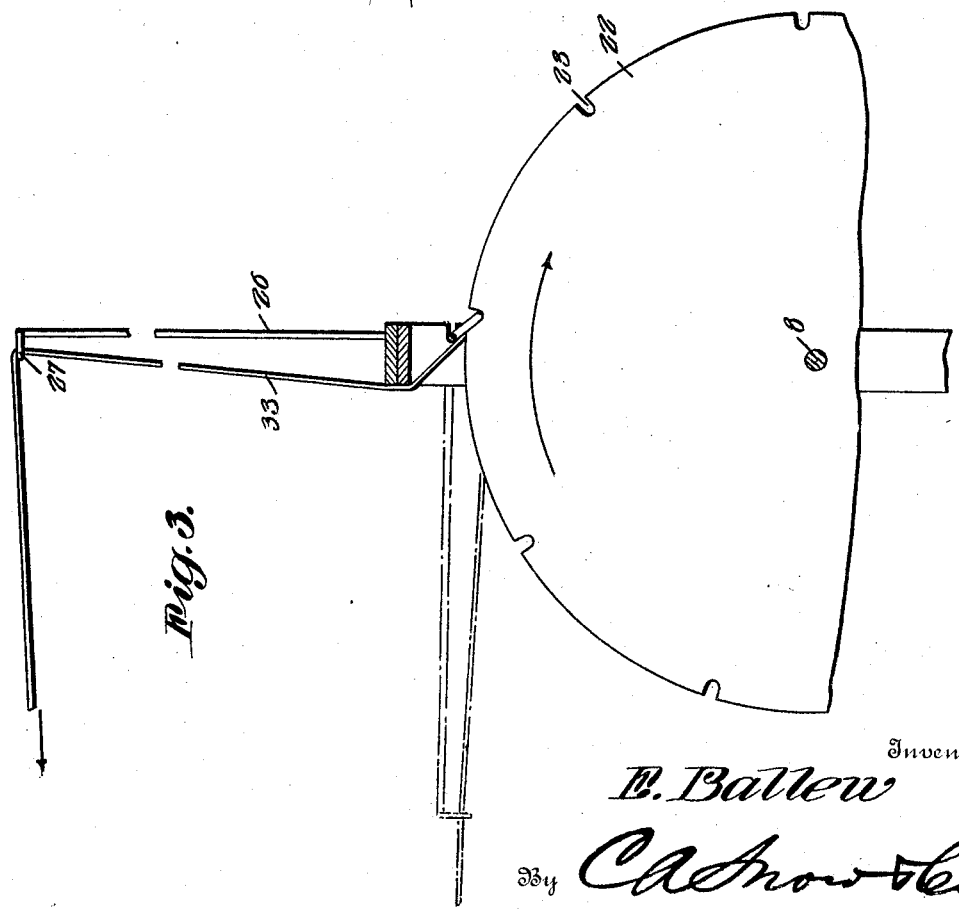
Inventor
E. Ballew
By C. A. Snow & Co.
Attorneys Patented Jan. 27, 1925.

1,524,011

UNITED STATES PATENT OFFICE.

ED BALLEW, OF CHERRYVALE, KANSAS.

FISHING MACHINE.

Application filed June 3, 1924. Serial No. 717,575.

*To all whom it may concern:*

Be it known that I, ED BALLEW, a citizen of the United States, residing at Cherryvale, in the county of Montgomery and State of Kansas, have invented a new and useful Fishing Machine, of which the following is a specification.

This invention aims to provide a simple means whereby, when a fish bites or pulls on the line, the efforts of the fish will release a spring-actuated drum which will jerk the hook into the fish and reel in the line and the fish, without attention from the fisherman, a signal being given when the drum starts to operate.

It is within the province of the disclosure to improve generally and to enhance the utility of devices of that sort to which the invention appertains.

Although a preferred form has been shown, it will be understood that a mechanic, working within the scope of what is claimed, may make changes, without departing from the spirit of the invention.

In the drawings:—Figure 1 is a side elevation, wherein parts are broken away; Figure 2 is an elevation wherein the device is viewed edgewise, parts being broken away; Figure 3 is a sectional elevation illustrating the operation of the device; Figure 4 is a detail enlarged from Figure 1, the pawl having been shifted out of engagement with the ratchet wheel.

In carrying out the invention, there is provided a support, which is denoted generally by the numeral 1, the support comprising a rectangular frame 2 made up of U-shaped members 3 having their upper and lower ends overlapped and connected by securing devices 4. The support 1 includes a post or rod 5, adapted to be driven to the ground, the upper end of the post passing through the lower end of the frame 2 removably, the frame being supported on the post 5 by an abutment 6, the frame and the post being held together removably by any suitable means, such as a pin 7, the lower part of the frame 2 being located between the abutment 6 and the pin 7.

A shaft 8 is journaled in the sides of the frame 2 and is provided with a crank 9 or any other suitable operating means. On the shaft 8 is mounted a nut 10 held in place by a pin 11 or the like, a ratchet wheel 12 being mounted on the shaft 8 between the nut 10 and the adjacent side portion of the frame 2. A pawl 14 is pivotally mounted at 15, intermediate its ends, on one side of the frame 2 and is constrained by a spring 16 to cooperate with the ratchet wheel 12, one end of the spring being connected to the frame 2, and the other end of the spring being connected to the lower end of the pawl 14. A dog 17 is pivotally mounted at 18, intermediate its ends, on the frame 2, and by swinging the dog 17 from the position of Figure 1 to the position of Figure 4, the pawl 14 may be held out of engagement with the ratchet wheel 12.

A drum 19 is journaled on the shaft 8 and is located between the side portions of the frame 2. The drum comprises telescoped members 20 held together by a securing element 21, such as a screw, the members 20 of the drum having projecting flanges 22 wherein notches or seats 23 are fashioned. Within the drum 19, a coiled spring 24 is located, one end of the spring being mounted on the securing element 21 which holds the parts 20 of the drum together, and the inner end of the spring being connected at 25 to the shaft 8.

A bail-shaped latch 26 is provided, and is supplied at its upper end with a guiding eye 27 disposed about at right angles to the latch. The side portions of the latch 26 are connected at their inner ends by a shaft 28 having an eccentric portion 29, the shaft being journaled in bearing notches 30 formed in the sides of the frame 2, the shaft being held in the notches by retainers 31 mounted in the sides of the frame 2. The frame 2 is provided at one side with a stop 32. A line 33 is wound about the drum 19 and is connected at one end thereto, as shown at 34, the line extending through the guiding eye 27 of the latch 26.

On one side of the frame 2, a signal 35, preferably in the form of a bell, is mounted. The bell is not described in detail, because it is a commercial article, not of my invention. So far as material to the description, the bell includes a stop 36 slidable in a guide 37 on the frame work of the bell, the stop having a shoulder 38 adapted to be engaged by a keeper 39 pivotally mounted at 40 on the frame work of the bell and located in the path of an arm 41 on the shaft 28 of the latch 26.

In practical operation, the dog 17 is disposed, as shown in Figure 1, in such relation to the pawl 14 that the pawl may cooperate with the ratchet wheel 12. The latch 26 is swung up into the position of Figure 3, until the eccentric portion 29 of the shaft 28 of the latch engages in the seats 23 of the drum 19, and holds the drum against rotation. Then, the shaft 8 may be rotated through the instrumentality of the crank 9, to put the spring 24 under tension, to any desired extent, the pawl 14 cooperating with the ratchet wheel 12 to hold the spring tension thus attained, the line 33 having been paid off the drum 19 to any desired extent. When the parts are arranged as above described, the keeper 39 cooperates with the stop 36 to hold the stop in the position to which it has been advanced by an operator, the bell 35 being silent, and the arm 41 on the shaft 28 of the latch 29 being disposed closely adjacent to the upper end of the keeper 39, as shown in Figure 4. When a fish pulls on the line 33, in the direction of the arrow shown in Figure 3, the latch 26 swings downwardly into the dotted line position of Figure 3, into engagement with the stop 36, the eccentric portion 29 of the shaft 28 of the latch being disengaged from the seats 23 in the drum 19, the arm 41 on the shaft 28 swinging the keeper 39 out of engagement with the shoulder 38 on the stop 36, the stop moving inwardly, and the bell 35 being sounded. When the eccentric portion 29 of the shaft 28 of the latch 26 is disengaged from the seats 23 of the drum 19, the drum is rotated responsive to the spring 24, the line 33 is wrapped about the drum, and the fish is hauled in: or, if the strength of the fish is sufficient to overcome the spring 24, the spring still will hold the line 33 taut, until the fish is tired out, whereupon the fish will be hauled in, as aforesaid. In the event that it is desired to wind the line 33 on the drum 19 rapidly, and without putting the spring 24 under tension, the pawl 14 may be moved out of engagement with the ratchet wheel 12, as shown in Figure 4.

I claim:—

1. In a device of the class described, a support, a shaft journaled in the support, a pawl and ratchet connection between the shaft and the support, a drum journaled on the shaft, a coiled spring connected to the shaft and to the drum, a latch pivoted to the support and cooperating with the drum to hold the drum against rotation responsive to the spring, and a line wound about the drum and slidably engaged with the latch, the line constituting means for disengaging the latch from the drum when a pull is exerted on the line.

2. In a device of the class described, a support, a shaft journaled in the support, a pawl and ratchet connection between the shaft and the support, a drum journaled on the shaft, a coiled spring connected to the shaft and to the drum, a latch including a shaft mounted to rock in the support, the shaft comprising an eccentric portion, and the drum having a seat for the eccentric portion of the shaft, to hold the shaft against rotation responsive to the spring, and a line wound about the drum and slidably engaged with the latch, the line constituting means for disengaging the eccentric portion from the seat, when a pull is exerted on the line.

3. In a device of the class described, a support, a shaft journaled in the support, a ratchet on the shaft, a pawl pivoted to the support and cooperating with the ratchet, a dog movably mounted on the support and cooperating with the pawl to hold the pawl out of engagement with the ratchet, a drum journaled on the shaft, a coiled spring connected to the drum and to the shaft, a latch pivoted to the support and cooperating with the drum to hold the drum against rotation responsive to the spring, and a line wound about the drum and slidably engaged with the latch, the line constituting means for disengaging the latch from the drum when a pull is exerted on the line.

4. In a device of the class described, a support, a spring-actuated drum journaled on the support, a latch mounted to swing on the support and cooperating with the drum to hold the drum against rotation, a line wound about the drum and engaged with the latch, the line constituting means for disengaging the latch from the drum when a pull is exerted on the line, and a signal on the support, the latch comprising a part which actuates the signal when the latch is disengaged from the drum.

In testimony that I claim the foregoing as my own, I have hereto affixed my signature in the presence of two witnesses.

ED BALLEW.

Witnesses:
L. R. ANDERSON,
JOHN FISHER.